United States Patent
Yee et al.

(10) Patent No.: US 9,552,555 B1
(45) Date of Patent: *Jan. 24, 2017

(54) METHODS, SYSTEMS, AND MEDIA FOR RECOMMENDING CONTENT ITEMS BASED ON TOPICS

(71) Applicant: Google Inc., Mountain View, CA (US)

(72) Inventors: Yangli Hector Yee, San Francisco, CA (US); James Vincent McFadden, San Francisco, CA (US); John Kraemer, San Francisco, CA (US); Dasarathi Sampath, San Bruno, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/816,866

(22) Filed: Aug. 3, 2015

Related U.S. Application Data (63) Continuation of application No. 13/731,266, filed on Dec. 31, 2012, now Pat. No. 9,129,227.

(51) Int. Cl.
*G06N 99/00* (2010.01)
*G06F 17/30* (2006.01)

(52) U.S. Cl.
CPC ......... *G06N 99/005* (2013.01); *G06F 17/3053* (2013.01); *G06F 17/30554* (2013.01); *G06F 17/30781* (2013.01)

(58) Field of Classification Search
None
See application file for complete search history.

(56) References Cited

U.S. PATENT DOCUMENTS 6,727,914 B1 * 4/2004 Gutta ................. H04N 7/163
348/E7.061
6,981,040 B1 * 12/2005 Konig ............. G06F 17/30867
707/E17.109

(Continued)

OTHER PUBLICATIONS

"User Adaptive Recommendation Model by Using User Clustering based on Decision Tree", Sanghyun Ryu et al, Computer and Information Technology (CIT), IEEE 10$^{th}$ International Conference on Jun. 29-Jul. 1, 2010, pp. 1346-1351.*

(Continued)

*Primary Examiner* — Kakali Chaki
*Assistant Examiner* — Mai T Tran
(74) *Attorney, Agent, or Firm* — Byrne Poh LLP (57) ABSTRACT

Mechanisms for recommending content items based on topics are provided. In some implementations, a method for recommending content items is provided that includes: determining a plurality of accessed content items associated with a user, wherein each of the plurality of content items is associated with a plurality of topics; determining the plurality of topics associated with each of the plurality of accessed content items; generating a model of user interests based on the plurality of topics, wherein the model implements a machine learning technique to determine a plurality of weights for assigning to each of the plurality of topics; applying the model to determine, for a plurality of content items, a probability that the user would watch a content item of the plurality of content items; ranking the plurality of content items based on the determined probabilities; and selecting a subset of the plurality of content items to recommend to the user based on the ranked content items.

18 Claims, 8 Drawing Sheets

(56) References Cited

U.S. PATENT DOCUMENTS

| | | |
|---|---|---|
| 8,260,117 B1 | 9/2012 | Xu et al. |
| 8,751,427 B1 | 6/2014 | Mysen et al. |
| 2003/0066068 A1 | 4/2003 | Gutta et al. |
| 2007/0028266 A1* | 2/2007 | Trajkovic ............... G06Q 30/02 725/46 |
| 2009/0006190 A1 | 1/2009 | Lucash et al. |
| 2009/0055385 A1 | 2/2009 | Jeon et al. |
| 2009/0282034 A1 | 11/2009 | Goronzy et al. |
| 2010/0114929 A1 | 5/2010 | Bonchi et al. |
| 2010/0228777 A1* | 9/2010 | Imig ................. G06F 17/30699 707/772 |
| 2011/0029534 A1* | 2/2011 | Maeda .............. G06F 17/30958 707/738 |
| 2011/0191374 A1 | 8/2011 | Bengio et al. |
| 2012/0054278 A1* | 3/2012 | Taleb ..................... G06Q 50/01 709/204 |
| 2012/0102121 A1 | 4/2012 | Wu et al. |
| 2012/0143911 A1 | 6/2012 | Liebald et al. |
| 2015/0112918 A1* | 4/2015 | Zheng .................... G06Q 30/02 706/48 |

OTHER PUBLICATIONS

Davidson, J. et al., "The YouTube Video Recommendation System", In Proceedings of the Fourth ACM Conference on Recommender System, Barcelona, ES, Sep. 26-30, 2010, pp. 293-296.

Duchi, J. et al., "Boosting with Structural Sparsity", In Proceedings of the 26th Annual International Conference on Machine Learning (ICML '09), Montreal, CA, Jun. 14-18, 2009, pp. 297-304.

Office Action dated Dec. 3, 2014 in U.S. Appl. No. 13/731,266.

Weston, J. et al., "Large Scale Image Annotation: Learning to Rank with Joint Word-Image Embeddings", In Machine Learning, Oct. 2010, vol. 81, No. 1, pp. 1-16.

Weston, J. et al., "Large Scale Music Annotation and Retrieval: Learning to Rank in Joint Semantic Spaces", In Journal of New Music Search, May 26, 2011, pp. 1-16.

\* cited by examiner

- 410 ACCESS AN INTEREST PROFILE OF TOPICS ASSOCIATED WITH THE USER, WHERE THE TOPICS ARE BASED ON THE CONTENT ITEMS VIEWED BY THE USER

- 420 ACCESS OTHER INTEREST PROFILES FROM MULTIPLE USERS, WHERE EACH OF THE INTEREST PROFILES INCLUDES TOPICS ASSOCIATED WITH A USER AND WHERE THE TOPICS ARE BASED ON THE CONTENT ITEMS VIEWED BY THE USER

- 430 GENERATE A DECISION TREE THAT DETERMINES SIMILARITIES BETWEEN THE INTEREST PROFILE AND THE OTHER INTEREST PROFILES (E.G., WHEN ONE OF THE OTHER INTEREST PROFILES HAS AT LEAST ONE SIMILAR TOPIC, THE INTEREST PROFILE IS PLACED UNDER A RIGHT SUB-TREE AS OPPOSED TO A LEFT SUB-TREE)

- 440 SELECT A SPLITTING NODE THAT BALANCES THE DECISION TREE (E.G., A NODE THAT ASSIGNS INTEREST PROFILES TO SUBGROUPS SUCH THAT THE POPULATION BETWEEN THE LEFT SUB-TREE AND THE RIGHT SUB-TREE IS BALANCED)

- 450 DETERMINE THE CONJUNCTION OF A PORTION OF THE DECISION TREE (E.G., THE TOPICS OF THE INTEREST PROFILES HAVING SIMILAR INTERESTS) AND THE CONTENT ITEMS (E.G., DECISION_TREE_LEAF $\otimes$ VIDEO_ID, DECISION_TREE_LEAF $\otimes$ CHANNEL_ID, ETC.)

METHODS, SYSTEMS, AND MEDIA FOR RECOMMENDING CONTENT ITEMS BASED ON TOPICS

CROSS-REFERENCE TO RELATED APPLICATIONS

This application is a continuation of U.S. patent application Ser. No. 13/731,266, filed on Dec. 31, 2012, which is hereby incorporated by reference herein in its entirety.

TECHNICAL FIELD

Methods, systems, and media for recommending content items based on topics are provided. More particularly, the disclosed subject matter relates to recommending content items by modeling user interest profiles that are based on content consumption.

BACKGROUND

Due to an overwhelming volume of content that is available to the average consumer, content hosting services generally attempt to present content that is interesting to its users. Some content hosting services allow users to create user profiles that indicate demographic information, such as gender or age, as well as areas of interest. These content hosting services then attempt to use such user profiles to select content to provide to each of its users. However, users may not be able to articulate their interests while populating a user profile. In addition, interests may change over time and these users may not update their user profiles to reflect such changes.

SUMMARY

In accordance with various implementations of the disclosed subject matter, mechanisms for recommending content items based on topics are provided.

In accordance with some implementations of the disclosed subject matter, a method for recommending content items is provided, the method comprising: determining, using a hardware processor, a plurality of accessed content items associated with a user, wherein each of the plurality of content items is associated with a plurality of topics; determining, using the hardware processor, the plurality of topics associated with each of the plurality of accessed content items; generating a model of user interests based on the plurality of topics, wherein the model implements a machine learning technique to determine a plurality of weights for assigning to each of the plurality of topics; applying, using the hardware processor, the model to determine, for a plurality of content items, a probability that the user would watch a content item of the plurality of content items; ranking, using the hardware processor, the plurality of content items based on the determined probabilities; and selecting a subset of the plurality of content items to recommend to the user based on the ranked plurality of content items.

In accordance with some implementations of the disclosed subject matter, a system for recommending content items is provided. The system comprising: a hardware processor that is configured to: determine a plurality of accessed content items associated with a user, wherein each of the plurality of content items is associated with a plurality of topics; determine the plurality of topics associated with each of the plurality of accessed content items; generate a model of user interests based on the plurality of topics, wherein the model implements a machine learning technique to determine a plurality of weights for assigning to each of the plurality of topics; apply the model to determine, for a plurality of content items, a probability that the user would watch a content item of the plurality of content items; rank the plurality of content items based on the determined probabilities; and select a subset of the plurality of content items to recommend to the user based on the ranked plurality of content items.

In accordance with some implementations of the disclosed subject matter, a computer-readable medium containing computer-executable instructions that, when executed by a processor, cause the processor to perform a method for recommending content items, is provided. The method comprises: determining a plurality of accessed content items associated with a user, wherein each of the plurality of content items is associated with a plurality of topics; determining the plurality of topics associated with each of the plurality of accessed content items; generating a model of user interests based on the plurality of topics, wherein the model implements a machine learning technique to determine a plurality of weights for assigning to each of the plurality of topics; applying the model to determine, for a plurality of content items, a probability that the user would watch a content item of the plurality of content items; ranking the plurality of content items based on the determined probabilities; and selecting a subset of the plurality of content items to recommend to the user based on the ranked plurality of content items.

BRIEF DESCRIPTION OF THE DRAWINGS

Various objects, features, and advantages of the disclosed subject matter can be more fully appreciated with reference to the following detailed description of the disclosed subject matter when considered in connection with the following drawing, in which like reference numerals identify like elements.

DETAILED DESCRIPTION

Methods, systems, and media for recommending content items using topics are provided.

In accordance with some embodiments of the disclosed subject matter, mechanisms for recommending content items, such as video content items and channels that provide video content items, using topics are provided. These content items and channels can be presented by a content hosting service (e.g., a video hosting service) or any other suitable content database. In response to determining the content items that have been accessed by a user on a content hosting service, one or more topics associated with each of the content items can be determined.

It should be noted that a channel, in some embodiments, is a group of videos or video content items from a particular source. In another embodiment, a channel is a group of videos or video content items with a common attribute, such as a source, a topic, a date, etc.

It should also be noted that, in some embodiments, a user interest profile can be accessed to determine which content items have been accessed by the user. For example, in response to logging into a user account, a content hosting service can associate and store information relating to content items that have been accessed by the user in a user interest profile. In some embodiments, the user interest profile can also include user interactions with the content items, such as pausing, fast forwarding, rewinding a particular content item, rating a particular content item, sharing a particular content item, the amount of time a particular content item is watched, etc. Additionally or alternatively, a user access log can be accessed to determine which content items have been accessed by the user.

In some embodiments, the topics associated with each of the content items can be determined from the user interest profile. For example, topics can be derived from metadata associated with a content item (e.g., genre, category, title, actor, director, description, etc.). In another example, a content database (e.g., a video database) or a knowledgebase can be queried to determine, for each accessed content item, the topics associated with each content item and/or other suitable topic information (e.g., an interest weight associated with each topic).

Based on one or more of the associated topics, a model of user interests can be generated using one or more machine learning techniques. The model of user interests derived using machine learning techniques can be used, for example, in conjunction with linear regression to provide predictions or probabilities of the likelihood that the user accesses or watches a particular content item or a particular channel that presents particular content items. By ranking content items based on the determined probabilities, a subset of content items or channels presenting content items can be selected for recommending to the user.

It should be noted that any suitable machine learning technique can be used to generate a model of user interests.

For example, a model of user interests can be generated using a machine learning approach, where a subset of topics, such as the top K topics, from a user interest profile can be determined and a conjunction of the subset of topics and the content items associated with a content hosting service can be determined. In another example, a model of user interests can be generated by using a hierarchical agglomerative clustering approach to create topic clusters of related topics, where a user interest profile of topics can be mapped to one or more topic clusters and a conjunction of those topic clusters and the content items associated with a content hosting service can be determined. In yet another example, a model of user interests can be generated using vector clustering approaches.

These mechanisms can be used in a variety of applications. For example, these mechanisms can allow a content hosting service, using these models of user interests, to propagate interests in a content item or a channel that presents content items from a single user or a group of users to other users, thereby generalizing the content recommendation system beyond the preferences of a single user. In another example, these mechanisms can allow a content hosting service to recommend content items or a channel that presents content items to a user that is unaware of the availability of such a content item or channel.

Although the embodiments described herein generally relate to recommending video content items, such as television programs, movies, and video clips, this is merely illustrative. For example, these content recommendation mechanisms can be implemented in a product search domain or commerce domain, where one or more topics associated with a user are determined from product metadata relating to products viewed by a user and a model of user interests is generated based on those topics. In another example, these content recommendation mechanisms can be implemented in a music search domain, where one or more topics associated with a user are determined from structured music metadata relating to media accessed by the user and a model of user interests can be generated based on those topics. Accordingly, the content recommendation mechanisms can be used in any suitable recommendation system for providing recommended content items.

Figure 1:
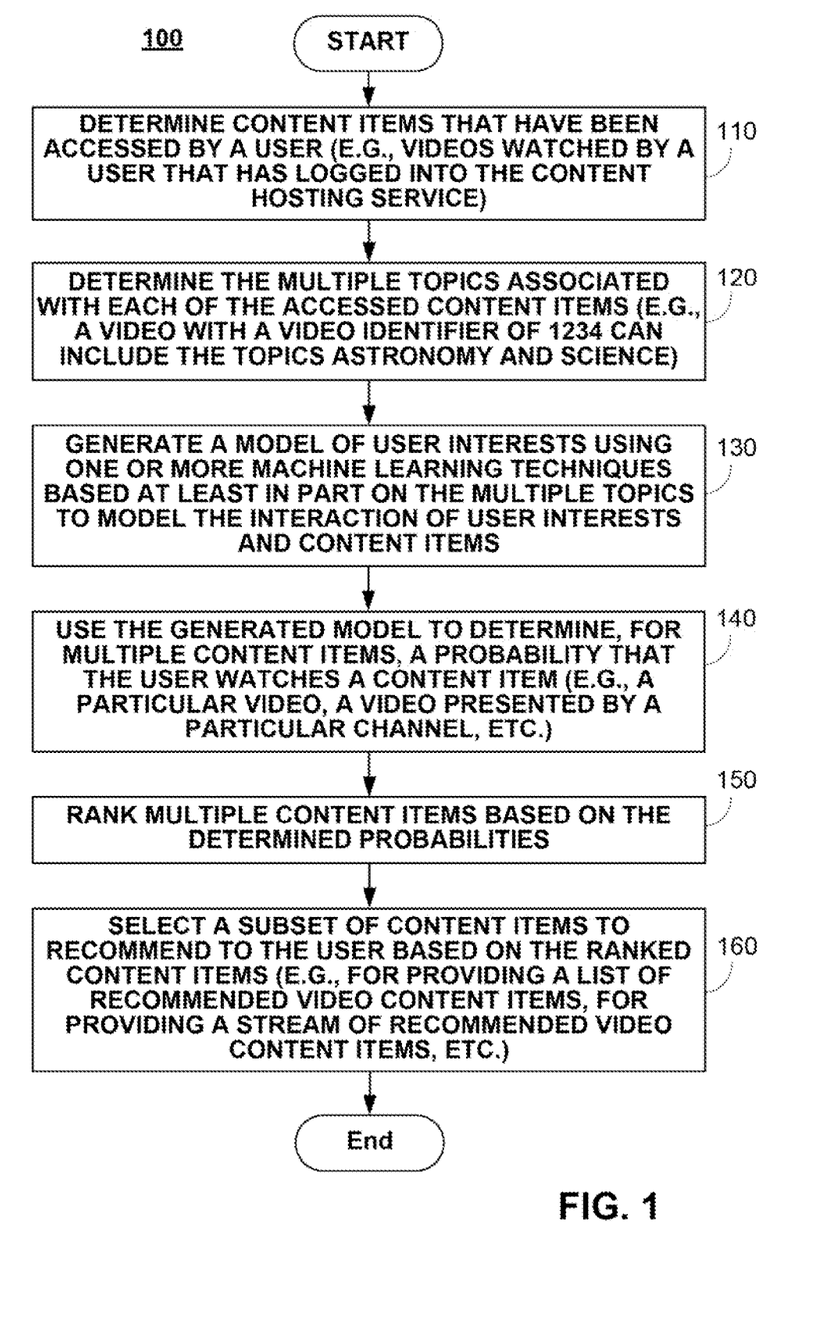
FIG. 1 is a flowchart of an illustrative process for recommending content items, such as video content items and channels that present video content items, based on topics in accordance with some embodiments of the disclosed subject matter.

Turning to FIG. 1, FIG. 1 is a flow chart of an illustrative process 100 for providing a content recommendation system that recommends content items based on topics in accordance with some embodiments of the disclosed subject matter.

Process 100 can begin by determining the content items that have been accessed by a user. For example, in response to detecting that a user has logged into a content hosting service (e.g., by entering a username and password), information relating to the content items that the user has accessed can be stored in a user interest profile. The content recommendation system can access the user interest profile to determine the content items that have been accessed by the user. In another example, the content recommendation system can transmit a query to a user access log associated with the user to determine the content items that have been accessed by the user. In a more particular example, the content recommendation system can retrieve multiple content identifiers associated with the content items accessed by the user (e.g., video identifiers, such as "video_id:1234," that are associated with each video watched by the user).

In situations in which the content recommendation system discussed herein collects personal information about users, or may make use of personal information, the users can be provided with an opportunity to control whether programs or features collect user information (e.g., information about content items accessed by a user, a user's interactions with content items, a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, zip code, or state level), so that a particular location of a user cannot be determined. Thus, the user may have control over how information is collected about the user and used by a content server.

At 120, the content recommendation system can determine one or more topics associated with each of the content items accessed by the user. For example, a video content item relating to the supernova SN_1987A can have the topics "SN_1987A" and "astronomy." In another example, the user interest profile can include the content items accessed by the user and a list of the one or more topics associated with each of the content items accessed by the user.

It should be noted that each content item on a content hosting service can be annotated with entities or topics created by a content source. For example, the topics associated with the content items can be created by a community of users in a collaborative knowledgebase, such as Freebase. In another example, the topics associated with the content items can be generated based on content metadata, such as unique terms derived from video titles, actor names, character names, director names, genres or category information, etc. In these examples, the content recommendation system can transmit a query to a content database (e.g., a video database, a knowledgebase having entity information or topic information, etc.) to determine, for each of the accessed content items, the topics associated with each content item.

It should also be noted that the topics associated with a content item can be stored along with other metadata associated with the content item. Alternatively, instead of being stored with the metadata of each content item, the topics and/or other information relating to the topics can be stored in a separate database.

In some embodiments, an interest weight can be associated with each topic. For example, a topic corresponding to an accessed content item can be associated with an interest weight that represents the strength or degree of association of the topic for a given content item. The interest profile can, in some embodiments, be represented as a weighted sum of all of the topics associated with the content items accessed by the user. For example, the interest weight for a particular topic in a user interest profile can be a product, sum, average, or other arithmetic function of the interest weight normalized by the frequency of the topic in the user interest profile. In a more particular example, the interest weight for the topic "astronomy" can be high in comparison to the interest weights associated with other topics when the topic "astronomy" is a frequent topic of content items accessed by the user.

Referring back to FIG. 1, upon determining the topics associated with each of the content items accessed by the user, the content recommendation system can generate a model of user interests using one or more machine learning techniques at 130.

Generally speaking, user modeling can include one or more input features. As used herein, a feature can be represented by feature-value pairs—i.e., a feature template and a feature value. For example, the feature for a particular video content item (video_id) can have the value "1234" or video_id:1234. In this example, the feature video_id:1234 can model the global popularity of a video content item having the video identifier "1234." When used by itself, such a model determines the probability that a user watches the video content item having the video identifier "1234." In another example, a feature can be used to model a channel (channel_id). In this example, the feature channel_id:ABC123 can model the global popularity that a user watches video content items presented by the channel having the channel identifier "ABC123." Again, when used by itself, such a model determines the probability that a user watches video content items presented by the channel having the channel identifier "ABC123."

In some embodiments, user modeling can include one or more input features relating to the user. For example, a user feature, such as user_id, can model the probability that a given user accesses any content item provided by a content hosting service. In a more particular example, the feature user_id:XYZ can determine the probability that a user having a user identifier "XYZ" watches any video content item provided by a video hosting service. It should be noted that a model for a more discerning user can, for example, determine that the probability that the user accesses any content item provided by a content hosting service is low.

Another input feature relating to the user can include a geographical location. For example, a user feature, such as user_geo, can model the probability that users from a particular geographical location watch any content item provided by a content hosting service. In a more particular example, the feature user_geo:GBR can determine the probability that users located in Great Britain (GBR) watch any video content item provided by a video hosting service.

In some embodiments, features can be used in conjunction with other features, where the conjunction is sometimes referred to herein as the ⊗ symbol. Based on the features, a covariance matrix can be generated by taking the outer product between the features—e.g., the sum of the products of the values associated with the features over different instances or sub-portions. For example, the user feature user_geo for geographical location can be used in conjunction with the feature channel_id for a particular channel to model regional preferences (e.g., USA, GBR, CAN, etc.) for the particular channel or channels. Using the example above, the feature template can be represented by "user_geo ⊗ channel_id." One illustrative instance of the conjunction can be "user_geo:GBR ⊗ channel_id:ABC123," which models the likelihood that a user from Great Britain (GBR) watches a video content item presented by a channel having a channel identifier "ABC123." These input features and conjunctions can be used to, for example, personalize the content recommendations provided to a user.

In some embodiments, these input features and conjunctions can be used to model users. More particularly, upon determining the list of entities and topics that a user has shown interest based on viewing history (e.g., the content items accessed by the user, the content items watched for a substantial period of time by the user, the content items that the user has provided a favorable indication, the content items that the user has shared with other users, etc.), the content recommendation system can use various input features and conjunctions to generate an interest model for a user using one or more machine learning techniques.

Illustrative examples of the one or more machine learning techniques that can be used to generate a model of user interests are described herein in connection with FIGS. 2-5.

Direct Interest Modeling

In some embodiments, the content recommendation system can generate a model of user interests using a direct interest modeling approach. For example, the content recommendation system can determine a subset of topics in a user interest profile and determine the conjunction of the subset of topics and the content items associated with a content hosting service.

Figure 2:
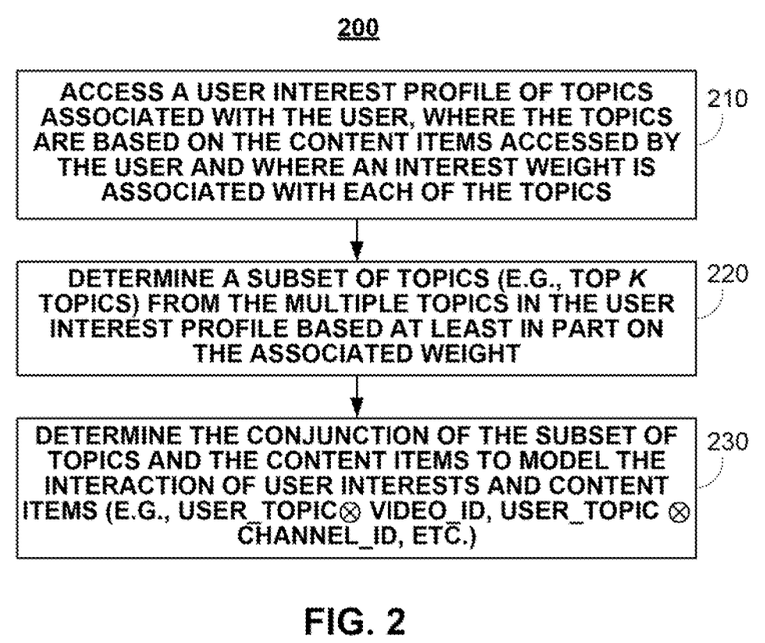
FIG. 2 is a flowchart of an illustrative process for modeling user interests using a subset of topics (e.g., top K topics) that are selected based on an associated interest weight in accordance with some embodiments of the disclosed subject matter.

FIG. 2 is a flowchart of an illustrative process for modeling user interests using a subset of topics (e.g., top K topics) based on an associated interest weight in accordance with some embodiments of the disclosed subject matter. At 210, the content recommendation system can access a user interest profile of topics associated with the user. As described above, the topics can be based on the content item accessed by the user and, in some implementations, an interest weight can be associated with each of the topics in the user interest profile. For example, an interest weight for the topic "science" can be high compared to other interest weights in response to determining that the user associated with the user interest profile watches a substantial number of video content items that are annotated with the topic "science."

At 220, the content recommendation system can determine a subset of topics from the multiple topics in the user interest profile. In some embodiments, the content recommendation system can determine the subset of topics based on the associated interest weight. For example, the content recommendation system can determine the top fifty topics in the user interest profile and determine the conjunction of the top fifty topics and the content items provided by the content hosting service. In another example, the content recommendation system can select a particular subset of topics from the user interest profile based on whether the associated interest weight is greater than a particular threshold value. In such an example, the threshold value can be determined such that at least a given number of topics have been selected. Additionally or alternatively, the threshold value can be adjusted by an administrative user using the content recommendation system (e.g., after inspecting the data, after inspecting the associated interest weights, etc.).

At 230, the content recommendation system can determine the conjunction of the subset of topics and the content items provided by the content hosting service to model the interaction of user interests and content items. For example, given a set of feature vectors representing a subset of topics, a model can be generated that indicates the probability that the user associated with the user interest profile watches a content item. In this example, if a video content item having a video identifier "567" (video_id:567) relates to astronomy and users with the topic "science" (user_topic:science) in their user interest profile watch or are highly likely to watch the video content item, the instance for the conjunction "user_topic:science ⊗ video_id:567" can have a high weight or probability value.

Although the embodiments described herein generally relate to determining the conjunction between content items and a topic, a topic cluster, or any other suitable representation derived from topic information, this is merely illustrative. For example, the content recommendation system can determine the conjunction between topics (e.g., user topics) and a particular channel (e.g., channel_id) to model the interaction of user interests and a particular channel. This conjunction can be represented as, for example, "user_topic ⊗ channel_id."

It should also be noted that, although the illustrative example shown in FIG. 2 accesses a user interest profile associated with a user and generates a model of user interests based on at least a portion of the topics from the user interest profile, any suitable number of user interest profiles can be used. For example, the content recommendation system can determine that a user has similar interests to a group of users. In this example, the content recommendation system can access the user interest profiles associated with the user and each user in the group of users and determine a subset of topics that are common to the multiple users and that have interest weights greater than a particular threshold value. This subset of topics can then be used in conjunction with content items that are provided by the content hosting service.

Topic Clustering

In some embodiments, the content recommendation system can generate a model of user interests using a topic clustering approach. For example, the content recommendation system can identify one or more topic clusters of related topics that are similar to the topics included in a user interest profile and determine the conjunction of the one or more topic clusters and the content items associated with a content hosting service. As opposed to directly modeling the topics associated with a user in a user interest profile, the content recommendation system can map the topics in the user interest profile to one or more topic clusters and generate an interest model based on the topic clusters.

Figure 3:
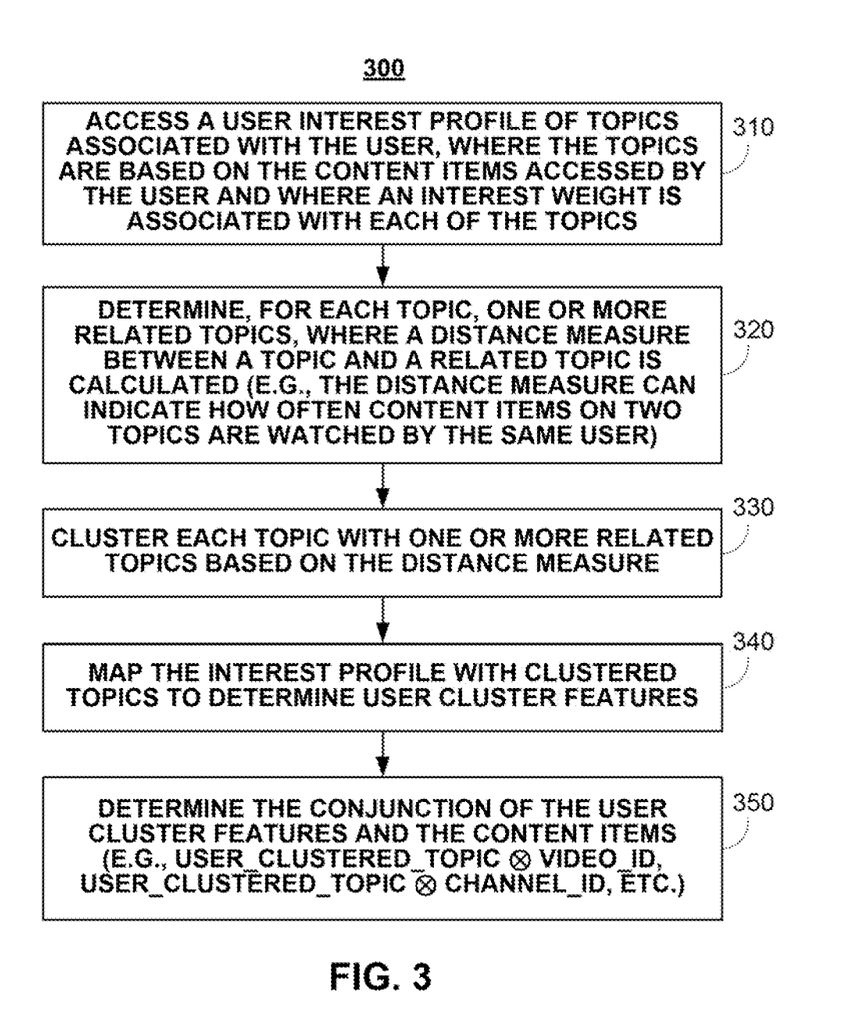
FIG. 3 is a flowchart of an illustrative process for modeling user interests using topic clusters including related topics, where topics associated with the content items viewed by the user are mapped to one or more topic clusters, in accordance with some embodiments of the disclosed subject matter.

FIG. 3 is a flowchart of an illustrative process for modeling user interests using topic clusters in accordance with some embodiments of the disclosed subject matter. At 310, the content recommendation system can access a user interest profile of topics associated with the user. As described above, the topics can be based on the content items accessed by the user and, in some implementations, an interest weight can be associated with each of the topics in the user interest profile.

At 320, the content recommendation system can determine, for each topic, one or more related topics. Any suitable approach can be used for determining related topics. For example, the content recommendation system can use the co-occurrence of topics in user interest profiles to determine which topics are related to each other. In this example, the content recommendation system can determine across multiple user interest profiles (e.g., all of the user interest profiles in the content hosting service), pairs of topics that co-occur in at least a portion of the user interest profiles, and determine a measure of co-occurrence or any other suitable distance measure. The distance measure can, for example, indicate how often video content items on two co-occurring topics have been accessed by a user.

Additionally or alternatively, the content recommendation system can determine related topics by querying an alternate source that specifies relationships between entities or topics, such as a knowledgebase (e.g., Freebase). For example, in response to transmitting a query that includes a topic (e.g., topic: SN_1987A) to a knowledgebase, the content recommendation system can receive a related topic graph that includes a set of related topic nodes and distance measures between the various nodes. The content recommendation can use the related topic graph for determining topic clusters, where neighboring nodes to a topic node are semantically more related than nodes with larger distance measure from the topic node.

At 330, the content recommendation system can cluster each topic with one or more related topics based on the distance measure. For example, the content recommendation system can create topic clusters using any suitable clustering approaches, such as a hierarchical agglomerative clustering approach. The content recommendation system can identify the topic clusters having a distance measure less than a given threshold value (e.g., grouping topics together that are closer in distance) and combine the two or more topics into a topic cluster.

In some embodiments, in addition to combining topics into a topic cluster, the content recommendation system can generate an interest weight for the topic cluster. The interest weight for the topic cluster can combine the interest weights associated with each of the topics by, for example, adding, multiplying, averaging, or applying another arithmetic or statistical function on the interest weights. In some embodiments, the interest weight for the topic cluster can be normalized by, for example, the frequency of the co-occurring topics in the user interest profiles.

At 340, upon determining the multiple topic clusters of related topics, the content recommendation system can map the user interest profile (that includes topics associated with content items accessed by the user) with the topic clusters to determine user cluster features. For example, the content recommendation system can determine a topic cluster corresponding to each topic in the user interest profile. As a result, the content recommendation system can determine multiple topic clusters of related topics for association with a user interest profile.

It should be noted that, in some embodiments, topic clusters can be stored in the user interest profile as opposed to the topics associated with content items accessed by the user. Alternatively, topics associated with content items accessed by the user and topic clusters can be stored in the user interest profile.

At 350, the content recommendation system can determine the conjunction of the user cluster features (e.g., the topic clusters associated with the user interest profile) with content items provided by a content hosting service. That is, the content recommendation system can generate a matrix or any other suitable data representation that provides probabilities that a user of a user interest profile watches content items based on the user cluster features. Alternatively, in some embodiments, the content recommendation system can select a subset of user cluster features for modeling user interests (e.g., the topic clusters that have an interest weight greater than a particular threshold value, the topic cluster that has the highest interest weight, etc.).

As described above, the content recommendation system can also determine the conjunction between user cluster features and a particular channel (e.g., channel_id) to model the interaction of user interests and a particular channel. This conjunction can be represented as, for example, "user_clustered_topic ⊗ channel_id."

Decision Trees

In some embodiments, the content recommendation system can generate a model of user interests using unsupervised decision trees. For example, the content recommendation system can generate a decision tree that identifies user interest profiles having similar topics and determine the conjunction of the topics shared by those user interest profiles and the content items associated with a content hosting service. This can, for example, model the collective interests or topics of users whose user interest profiles are grouped in the same leaf node.

Figure 4:
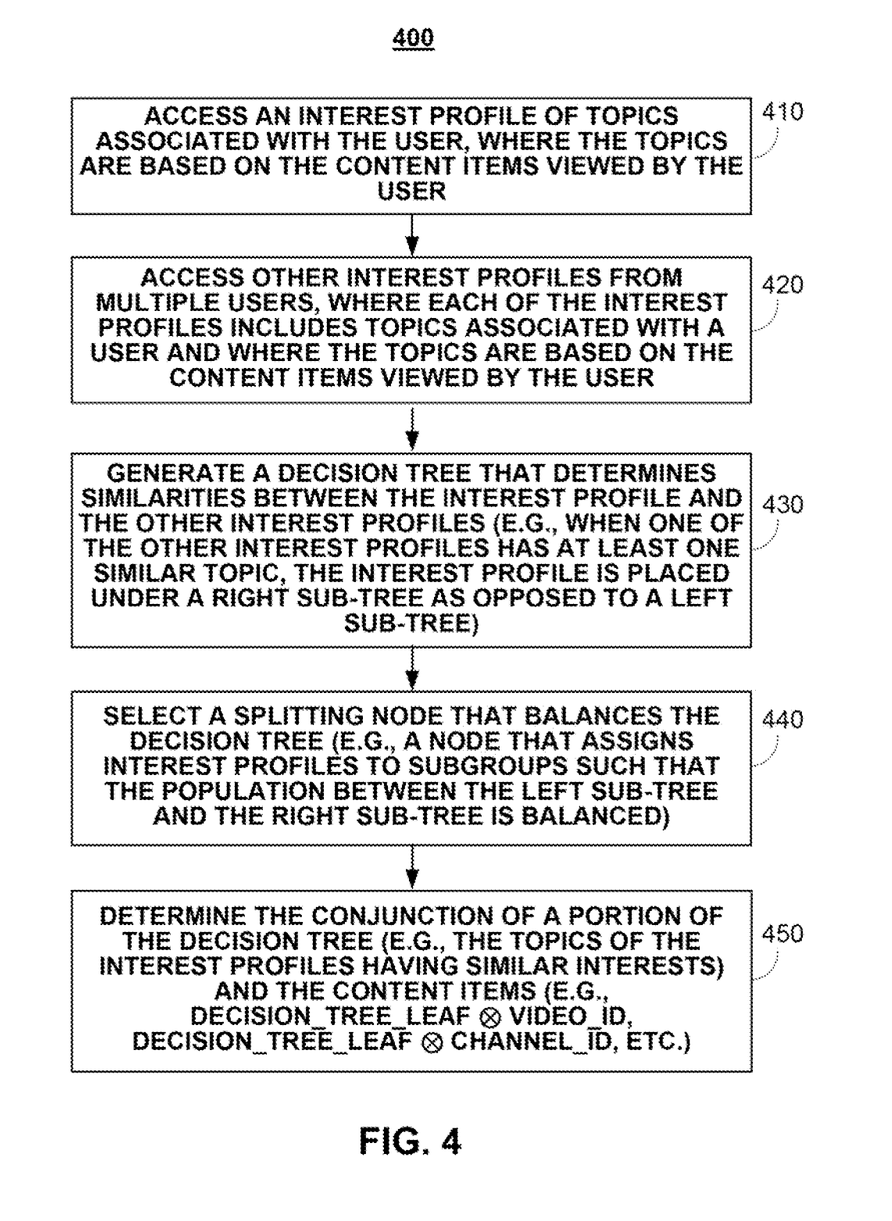
FIG. 4 is a flowchart of an illustrative process for modeling user interests using a decision tree that groups or clusters user interest profiles associated with the same or similar topics in accordance with some embodiments of the disclosed subject matter.

FIG. 4 is a flowchart of an illustrative process for modeling user interests using a decision tree that groups or clusters user interest profiles having similar topics in accordance with some embodiments of the disclosed subject matter. At 410, the content recommendation system can access a user interest profile of topics associated with the user. As described above, the topics are based on the content items accessed by the user.

At 420, the content recommendation system can access other user interest profiles (e.g., all of the user interest profiles in the content hosting service), where each user interest profile includes topics associated with the content items accessed by that user.

In some embodiments, a vector clustering approach, such as a k-means approach, can be used to form a community of user interest profiles. It should be noted that, in some implementations, the content recommendation system can replace the Euclidean distance calculation in the vector clustering approach with a dot product calculation. At 430, a decision tree can be constructed that determines the similarities between a user interest profile and other interest profile. The content recommendation system can use a decision tree algorithm in which user interest profiles are stored based on topic feature values so that nodes of the decision tree represent a feature that is being classified and branches of the tree represent a value that the node may assume. Results may be classified by traversing the decision tree from the root node through the tree and sorting the nodes using their respective values. For example, a binary decision tree can be constructed such that, at any node, if the dot product between the node and the user interest profile is non-zero, the node is placed under a right sub-tree. Otherwise, the left child is chosen and the node is placed under a left sub-tree.

In a more particular example, a top level or root node can contain the topics "Backyard Wrestling," "Wrestling," and "Beer." If any user interest profile contains one or more of the topics in the top level node, the user interest profile is placed under the right sub-tree. This can, for example, partition user interest profiles into clusters that tend to contain users with similar interests and similar topics. In some embodiments, the nodes placed under the left sub-tree can be removed or otherwise excluded from generating the model of user interests.

In some embodiments, at 440, the content recommendation system can select a splitting node such that the population between right nodes and left nodes is generally balanced.

At 450, the content recommendation system can obtain the portion of the decision tree that includes similar user interest profiles and determine the conjunction of this portion of the decision tree and the content items provided by a content hosting service. For example, the content recommendation system can use the right sub-tree of the decision tree to create a feature that models the collective interests of users having user interest profiles that are clustered in the same leaf node. The content recommendation system can determine the conjunction of topics in the user interest profiles of a group of users in the same leaf node and the content items provided by a content hosting service. In a more particular example, this conjunction can be represented as "unsupervised_decision_tree_leaf ⊗ video_id" or "unsupervised_decision_tree_leaf ⊗ channel_id."

Boosted Decision Trees

It should be noted that one or more aspects of the decision tree described above in connection with FIG. 4 can be constructed using any suitable iterative process. For example, a structure of the decision tree can be selected in an initial iteration and tested against training data from user interest profiles. The results of such testing with training data can be used to generate another structure of the decision tree in another iteration.

In some embodiments, the content recommendation system can model user interests using a boosted decision tree that jointly clusters content features and user. For example, the content recommendation system can determine that users interested in classical music (e.g., from the user interest profile, from preferences inputted by the user, etc.) are likely to watch video content items associated with the topic "Mozart" (topic: Mozart) but only if the sound track provided in the video content items is high quality or high fidelity.

Generally speaking, a boosting approach can be used to build a strong classifier by combining multiple weak classifiers and a boosted decision tree approach can be a combination of the decision tree approach and the boosting approach. For example, the content recommendation system can use a boosted decision tree approach, where the above-mentioned k-means clustering approach is used to split user interest profiles into a right sub-tree of similar user interest profiles and a left sub-tree of other user interest profiles. The content recommendation system can use the leaf node of similar user interest profiles as weak learners. The content recommendation system can then apply user features for training. For example, as described above, the quality of an audio track in a video content item, the quality of a video content item (e.g., resolution), and other user features can be used to train a joint model of user and content features. In another example, user features can be used to filter out candidate content items to recommendation to the user (e.g., a particular content item includes a low-quality audio track that would not be of interest to the user).

Latent Embedding

In some embodiments, the content recommendation system can generate a model of user interests by mapping content items and topics into a multi-dimensional space. For example, in some implementations, the content recommendation system can generate a decision tree that identifies user interest profiles having similar topics and determine the conjunction of the topics shared by those user interest profiles and the content items associated with a content hosting service.

Figure 5:
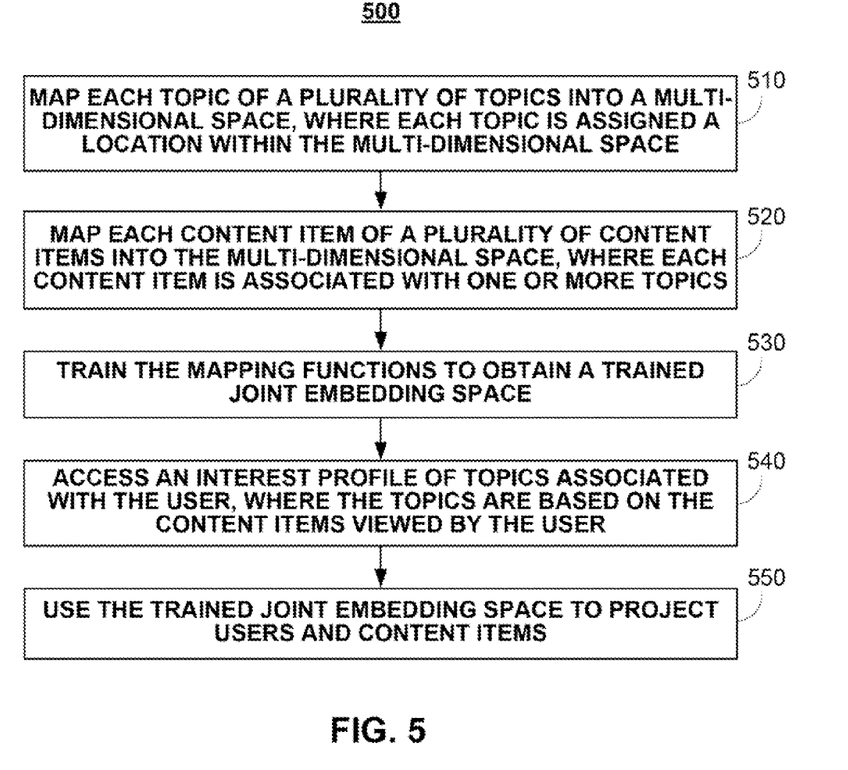
FIG. 5 is a flowchart of an illustrative process for modeling user interests using embedding trees, where multiple topics and multiple content items are mapped into a multi-dimensional space and the embedding tree is trained such that a loss or error function is minimized, in accordance with some embodiments of the disclosed subject matter.

FIG. 5 is a flowchart of an illustrative process for modeling user interests using latent embedding, where multiple topics and multiple content items are mapped into a multi-dimensional space and a user interest model is trained such that a loss or error function is minimized, in accordance with some embodiments of the disclosed subject matter.

At 510, the content recommendation system can map each topic of a plurality of topics into a multi-dimensional space. For example, each topic can be initially assigned a random location in a 64th-dimensional space. It should be noted that the number of dimensions (e.g., 64) can be predetermined. In addition, the number of dimensions of the multi-dimensional embedding space can be determined based upon any suitable criterion, such as available computing resources, size of the training database, etc.

At 520, the content recommendation system can also map each content feature of a plurality of content features into the multi-dimensional space.

Upon configuring a joint embedding space that embeds data items including topics and content items, mapping functions that map each type of data item to the joint embedding space can be learned at 530. For example, the content recommendation system can iteratively select sets of embedded training items and determine if the distances between the selected items based on the current location in the joint embedding space corresponds to the known relationships between those items. In a more particular example, an error function, such as a hinge ranking loss function, can be calculated such that if A and B are topics associated with a user interest profile, the dot product of A and B is closer than another topic, C. This can be represented, for example, as:

$$A'^{*}w \cdot B'^{*}w > A'^{*}w \cdot C'^{*}w + \text{margin}$$

Otherwise, the mappings and locations of the topics in the multi-dimensional space are adjusted such that their locations relate to each other are improved.

Similar to the topics embedded in the multi-dimensional space, an error function can be calculated such that if A is a topic associated with a video content item V and C is another topic that is not associated with the video content item V, the dot product of topic A and video content item V is closer than topic C and video content item V. This can be represented, for example, as:

$$A'^{*}w \cdot V'^{*}w > C'^{*}w \cdot V'^{*}w$$

It should be noted that examples of functions that may be used as the error function in the training phase include the standard margin ranking loss (AUC) function and the weighted approximate-ranked pairwise (WARP) loss function. For example, to focus more on the top of a ranked list where the top k positions are of interest, the content recommendation system can use a WARP function to select negative examples, such as topic C. That is, samples are drawn at random, and a gradient step can be made for each sample to minimize loss. Due to the cost of computing the exact rank, the content recommendation system can approximate the exact rank by sampling. For a given positive label, the content recommendation system draws negative labels until a violating label is found, where the rank is then approximated.

In response to learning such that the error function is minimized, the content recommendation system can obtain a trained joint embedding space.

At 540, the content recommendation system can access a user interest profile of topics associated with the user. As described above, the topics can be based on the content items accessed by the user.

At 550, the content recommendation system can project the topics from the user interest profile into the trained joint embedding space. For example, the new items including the topics from the user interest profile can be embedded in the trained joint embedding space at a location determined upon the learned mapping function for topics. One or more associations between the newly embedded item and the previously embedded items can be determined based on a distance measure. For example, the content recommendation system can apply one or more techniques, such as Principal component analysis (PCA), Singular Value Decomposition (SVD), and Gaussian mixture modeling (GMM), to determine content items that are close in proximity.

It should be noted that the content recommendation system can use the learned joint embedding space to determine user preference for a topic, a video, or a channel. For example, the content recommendation system can project these items into the joint embedding space and calculate the dot product. In this example, the higher the dot product indicates a higher likelihood that the user associated with the user interest profile watches a particular content item or a channel that provides content items.

These and other machine learning techniques that train models in an embedding space are further described in, for example, Weston et al., "Web Scale Image Annotation: Learning to Rank with Joint Word-Image Embeddings" and Weston et al., "Large-Scale Music Annotation and Retrieval: Learning to Rank in Joint Semantic Spaces," which are hereby incorporated by reference herein in their entireties.

Recommending Content Items

The content recommendation system can provide a predictive model of user interests that can be used to determine a recommendation of one or more content items to a user. Based on features relating to topics and features relating to content items, the predictive model can determine a set of probabilities that represents the interaction between user interests and content items. For example, if a video content item relates to astronomy and users with the topic "science" in their user interest profile watch or are highly likely to watch the video content item, the instance for the conjunction of the topic and the video content item can have a high weight or probability value.

Referring back to FIG. 1, using the model of user interests and the determined watch probabilities, the content recommendation system can rank multiple content items based on their determined probabilities at 150. For example, the content recommendation system can use the model of user interests to generate a ranked list of candidate video items. In another example, the content recommendation system can use the model of user interests to generate a list of candidate video items sorted by watch probability and then re-rank the list using additional criteria, such as view count, ratings, recency (e.g., upload date), sharing activity, etc.

Figure 6:
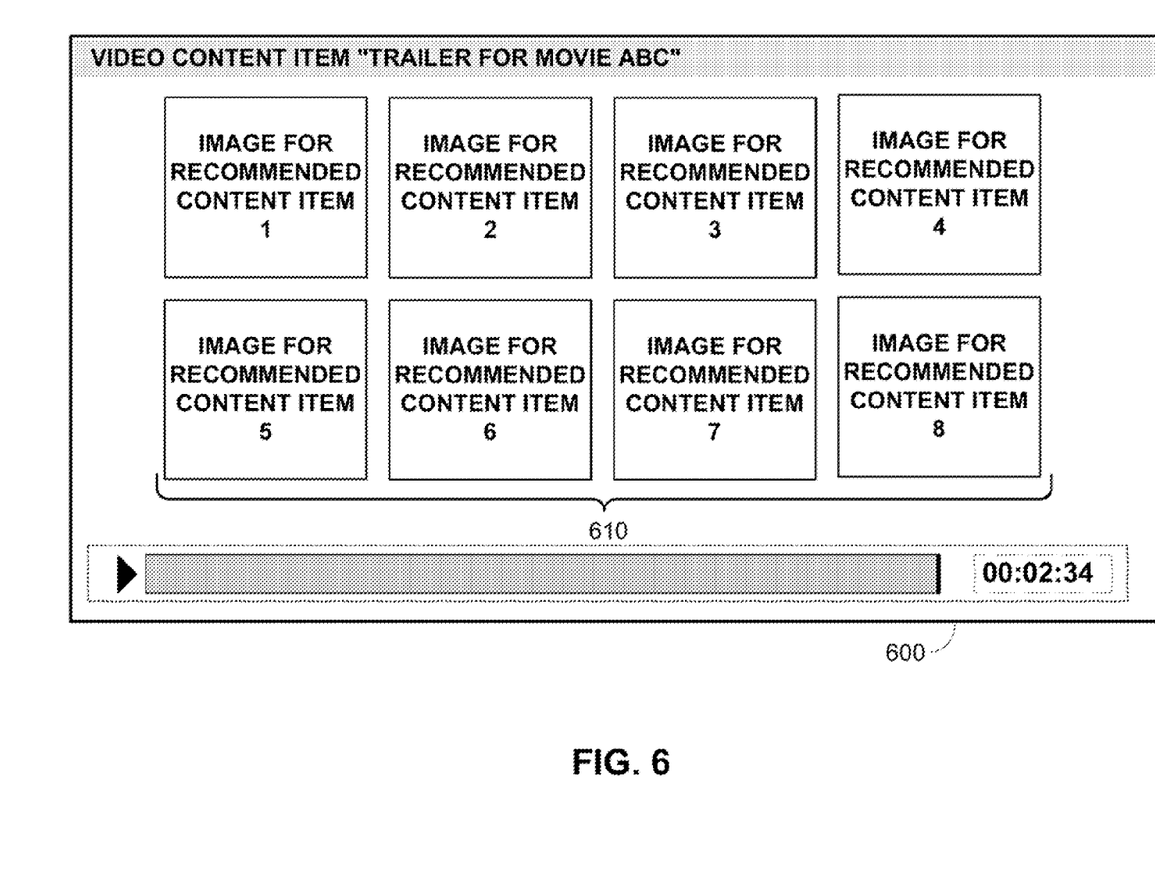
FIG. 6 is an illustrative screen of an interface that provides recommended content items to a user in accordance with some embodiments of the disclosed subject matter.
Figure 7:
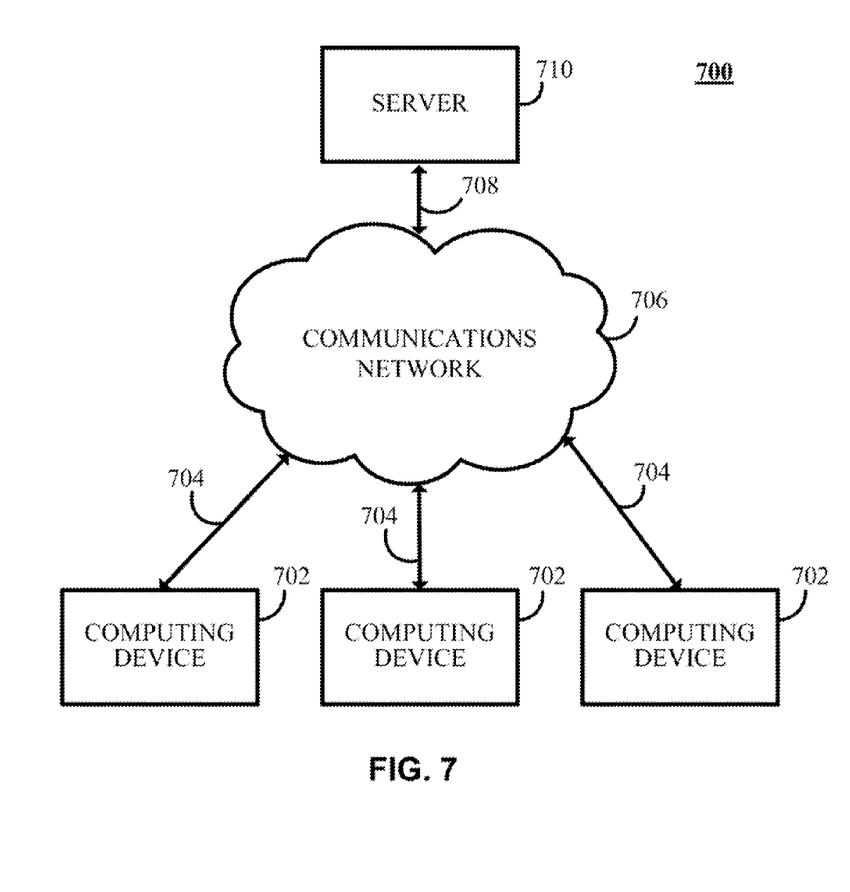
FIG. 7 is a diagram of an illustrative system suitable implementation of the content recommendation system in accordance with some embodiments of the disclosed subject matter.

At 160, the content recommendation system can select a subset of the content items from the ranked list to recommend to the user. For example, upon determining content items accessed by the user (e.g., using a user interest profile), determining topics associated with the accessed content items, generating a model of user interests based on the determined topics, and generating a list of content items that are ranked by watch probabilities derived using the model, the content recommendation system can select a particular number of content items from the ranked list to recommend to the user. In a more particular example, a content hosting service can indicate a number of recommendations that can be provided on an interface. As shown in FIG. 7, upon the completion of watching a video content item in video window 600, the content hosting service can request that a particular number of recommended content items (e.g., eight) are provided in region 610. As also shown, any suitable information can be displayed to provide the user with the recommended content items—e.g., a thumbnail or image, a title or a portion of a title, and/or a playback time associated with the recommended content item.

In some embodiments, the content recommendation system can determine whether one or more of the content items in the ranked list have been previously accessed by the user. For example, the content recommendation system can inhibit the recommendation of a content item that has been previously watched by the user (e.g., based on information from a user access log). In another example, the content recommendation system can adjust the ranking associated with the previously watched content item (e.g., lower the ranking of the previously watched content).

Content Recommendation System

FIG. 7 is a generalized schematic diagram of a content recommendation system in accordance with some implementations of the disclosed subject matter. As illustrated, system 700 can include one or more computing devices 702, such as a user computing device for providing search queries for content items and/or obtaining and playing back content items from a content hosting service, a tablet computing device for transmitting user instructions to a television device, etc. For example, computing device 702 can be implemented as a personal computer, a tablet computing device, a personal digital assistant (PDA), a portable email device, a multimedia terminal, a mobile telephone, a gaming device, a set-top box, a television, a smart television, etc.

In some implementations, computing device 702 can include a storage device, such as a hard drive, a digital video recorder, a solid state storage device, a gaming console, a removable storage device, or any other suitable device for storing media content, entity tables, entity information, metadata relating to a particular search domain, etc.

In some implementations, computing device 702 can include a second screen device. For example, a second screen device can present the user with recommended content items based on topics and, in response to receiving a user selection of one of the recommended content items, can transmit playback instructions for a user-selected content item to a television device.

Computing devices 702 can be local to each other or remote from each other. For example, when one computing device 702 is a television and another computing device 702 is a second screen device (e.g., a tablet computing device, a mobile telephone, etc.), the computing devices 702 may be located in the same room. Computing devices 702 are connected by one or more communications links 704 to a communications network 706 that is linked via a communications link 708 to a server 710.

System 700 can include one or more servers 710. Server 710 can be any suitable server for providing access to content recommendation system, such as a processor, a computer, a data processing device, or a combination of such devices. For example, the content recommendation system can be distributed into multiple backend components and multiple frontend components or interfaces. In a more particular example, a content hosting service can include the content recommendation system, which provides recommended content items based on topic information associated with users. In another more particular example, backend components, such as data distribution can be performed on one or more servers 710. Similarly, the graphical user interfaces displayed by the content hosting service, such as an interface for retrieving content items, can be distributed by one or more servers 710 to computing device 702.

In some implementations, server 710 can include any suitable server for accessing metadata relating to content items, user access logs, user interest profiles, topic and related topic information, etc.

More particularly, for example, each of the computing devices 702 and server 710 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, computing device 702 can be implemented as a personal computer, a tablet computing device, a personal digital assistant (PDA), a portable email device, a multimedia terminal, a mobile telephone, a gaming device, a set-top box, a television, etc.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 7, communications network 706 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 704 and 708 may be any communications links suitable for communicating data between computing devices 702 and server 710, such as network links, dial-up links, wireless links, hard-wired links, any other suitable communications links, or a combination of such links. Computing devices 702 enable a user to access features of the application. Computing devices 702 and server 710 may be located at any suitable location. In one implementation, computing devices 702 and server 710 may be located within an organization. Alternatively, computing devices 702 and server 710 may be distributed between multiple organizations.

Figure 8:
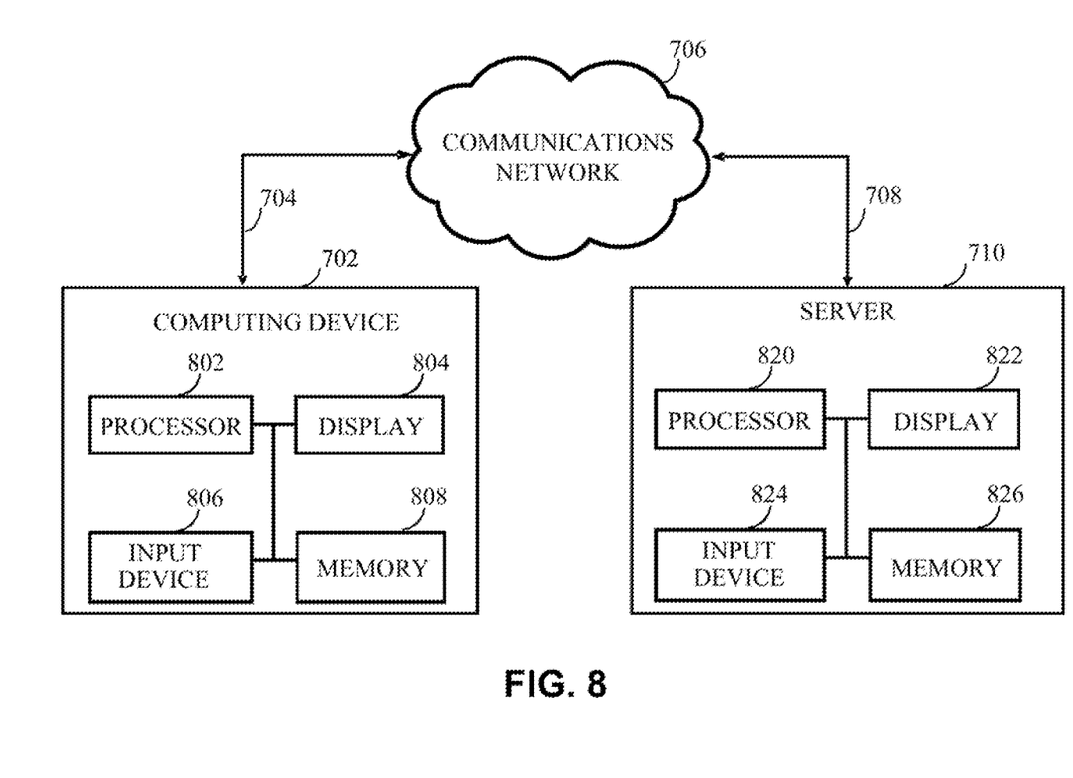
FIG. 8 is a diagram of an illustrative computing device and server as provided, for example, in FIG. 7 in accordance with some embodiments of the disclosed subject matter.

Referring back to FIG. 7, the server and one of the computing devices depicted in FIG. 7 are illustrated in more detail in FIG. 8. Referring to FIG. 8, computing device 702 may include processor 802, display 804, input device 806, and memory 808, which may be interconnected. In a preferred implementation, memory 808 contains a storage device for storing a computer program for controlling processor 802.

Processor 802 uses the computer program to present on display 804 the interfaces of the content hosting service and the data received through communications link 704 and commands and values transmitted by a user of computing device 702. It should also be noted that data received through communications link 704 or any other communications links may be received from any suitable source. Input device 806 may be a computer keyboard, a mouse, a keypad, a cursor-controller, dial, switchbank, lever, a remote control, or any other suitable input device as would be used by a designer of input systems or process control systems. Alternatively, input device 1206 may be a finger or stylus used on a touch screen display 804.

Server 710 may include processor 820, display 822, input device 824, and memory 826, which may be interconnected. In a preferred implementation, memory 826 contains a storage device for storing data received through communications link 708 or through other links, and also receives commands and values transmitted by one or more users. The storage device further contains a server program for controlling processor 820.

In some implementations, the application may include an application program interface (not shown), or alternatively, the application may be resident in the memory of computing device 702 or server 710. In another suitable implementation, the only distribution to computing device 702 may be a graphical user interface ("GUI") which allows a user to interact with the application resident at, for example, server 710.

In one particular implementation, the application may include client-side software, hardware, or both. For example, the application may encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the application is described herein as being implemented on a user computer and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, etc.) to provide such features.

Accordingly, methods, systems, and media for recommending content items based on topics are provided.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter. Features of the disclosed implementations can be combined and rearranged in various ways.

What is claimed is:

1. A method for recommending content items, the method comprising:
   determining a plurality of accessed content items associated with a user, wherein each of the plurality of accessed content items is associated with a plurality of topics;
   generating a user interest model of interactions between the plurality of topics and the plurality of accessed content items, wherein the user interest model (i) determines a plurality of related topics associated with the plurality of topics from the plurality of accessed content items, (ii) generates user interest information associated with the user using at least a portion of the plurality of related topics, (iii) determines similarities between the user interest information associated with the user and user interest information of other users including the at least a portion of the plurality of related topics associated with the user, and (iv) determines a conjunction of between the similarities and the plurality of accessed content items;
   applying the model to determine, for a plurality of content items, a probability that the user selects a content item from the plurality of content items for presentation;
   ranking the plurality of content items based on the determined probabilities; and selecting at least one of the plurality of content items to recommend to the user based on the ranked plurality of content items.

2. The method of claim 1, wherein the plurality of content items includes a channel that provides content items.

3. The method of claim 1, further comprising determining a conjunction that models interaction between the plurality of topics and the plurality of content items.

4. The method of claim 1, wherein generating the model of user interests further comprises:
selecting a subset of the plurality of topics associated with each of the plurality of content items, wherein the subset of the plurality of topics is selected based on a weight assigned to each of the plurality of topics; and
determining a conjunction that models interaction between the subset of the plurality of topics and the plurality of content items.

5. The method of claim 1, wherein generating the model of user interests further comprises:
determining related topics for each of the plurality of topics, wherein a distance value between a topic and a related topic is calculated;
determining a plurality of topic clusters, wherein one or more of the plurality of topics and one or more of the related topics are placed in a topic cluster based on the distance value;
mapping the user interest information to at least one of the plurality of topic clusters to obtain user cluster features; and
determining a conjunction that models interaction between the user cluster features and the plurality of content items.

6. The method of claim 1, wherein generating the model of user interests further comprises:
generating a decision tree, wherein a portion of the decision tree identifies which of the user interest information of other users is similar to the user interest information of the user;
determining a subset of the plurality of topics based on the decision tree; and
determining a conjunction that models interaction between the subset of the plurality of topics and the plurality of content items.

7. A system for recommending content items, the system comprising:
a hardware processor that:
determines a plurality of accessed content items associated with a user, wherein each of the plurality of accessed content items is associated with a plurality of topics;
generates a user interest model of interactions between the plurality of topics and the plurality of accessed content items, wherein the user interest model (i) determines a plurality of related topics associated with the plurality of topics from the plurality of accessed content items, (ii) generates user interest information associated with the user using at least a portion of the plurality of related topics, (iii) determines similarities between the user interest information associated with the user and user interest information of other users including the at least a portion of the plurality of related topics associated with the user, and (iv) determines a conjunction of between the similarities and the plurality of accessed content items;
applies the model to determine, for a plurality of content items, a probability that the user selects a content item from the plurality of content items for presentation;
ranks the plurality of content items based on the determined probabilities; and
selects at least one of the plurality of content items to recommend to the user based on the ranked plurality of content items.

8. The system of claim 7, wherein the plurality of content items includes a channel that provides content items.

9. The system of claim 7, wherein the processor is further configured to determine a conjunction that models interaction between the plurality of topics and the plurality of content items.

10. The system of claim 7, wherein the processor is further configured to:
select a subset of the plurality of topics associated with each of the plurality of content items, wherein the subset of the plurality of topics is selected based on a weight assigned to each of the plurality of topics; and
determine a conjunction that models interaction between the subset of the plurality of topics and the plurality of content items.

11. The system of claim 7, wherein the processor is further configured to:
determine related topics for each of the plurality of topics, wherein a distance value between a topic and a related topic is calculated;
determine a plurality of topic clusters, wherein one or more of the plurality of topics and one or more of the related topics are placed in a topic cluster based on the distance value;
map the user interest information to at least one of the plurality of topic clusters to obtain user cluster features; and
determine a conjunction that models interaction between the user cluster features and the plurality of content items.

12. The system of claim 7, wherein the processor is further configured to:
generate a decision tree, wherein a portion of the decision tree identifies which of the user interest information of other users is similar to the user interest information of the user;
determine a subset of the plurality of topics based on the decision tree; and
determine a conjunction that models interaction between the subset of the plurality of topics and the plurality of content items.

13. A non-transitory computer-readable medium containing computer-executable instructions that, when executed by a processor, cause the processor to perform a method for recommending content items, the method comprising:
determining a plurality of accessed content items associated with a user, wherein each of the plurality of accessed content items is associated with a plurality of topics;
generating a user interest model of interactions between the plurality of topics and the plurality of accessed content items, wherein the user interest model (i) determines a plurality of related topics associated with the plurality of topics from the plurality of accessed content items, (ii) generates user interest information associated with the user using at least a portion of the plurality of related topics, (iii) determines similarities between the user interest information associated with the user and user interest information of other users including the at least a portion of the plurality of related topics associated with the user, and (iv) determines a conjunction of between the similarities and the plurality of accessed content items;

applying the model to determine, for a plurality of content items, a probability that the user selects a content item from the plurality of content items for presentation;

ranking the plurality of content items based on the determined probabilities; and selecting at least one of the plurality of content items to recommend to the user based on the ranked plurality of content items.

14. The non-transitory computer-readable medium of claim 13, wherein the plurality of content items includes a channel that provides content items.

15. The non-transitory computer-readable medium of claim 13, wherein the method further comprises determining a conjunction that models interaction between the plurality of topics and the plurality of content items.

16. The non-transitory computer-readable medium of claim 13, wherein the method further comprises:

selecting a subset of the plurality of topics associated with each of the plurality of content items, wherein the subset of the plurality of topics is selected based on a weight assigned to each of the plurality of topics; and determining a conjunction that models interaction between the subset of the plurality of topics and the plurality of content items.

17. The non-transitory computer-readable medium of claim 13, wherein the method further comprises:

determining related topics for each of the plurality of topics, wherein a distance value between a topic and a related topic is calculated;

determining a plurality of topic clusters, wherein one or more of the plurality of topics and one or more of the related topics are placed in a topic cluster based on the distance value;

mapping the user interest information to at least one of the plurality of topic clusters to obtain user cluster features; and determining a conjunction that models interaction between the user cluster features and the plurality of content items.

18. The non-transitory computer-readable medium of claim 13, wherein the method further comprises:

generating a decision tree, wherein a portion of the decision tree identifies which of the user interest information of other users is similar to the user interest information of the user;

determining a subset of the plurality of topics based on the decision tree; and determining a conjunction that models interaction between the subset of the plurality of topics and the plurality of content items.

* * * * *